US012754019B2

(12) United States Patent
Miyazaki et al.

(10) Patent No.: US 12,754,019 B2
(45) Date of Patent: Oct. 6, 2026

(54) SENSOR, SENSOR SYSTEM, AND ELECTRONIC DEVICE

(71) Applicant: KABUSHIKI KAISHA TOSHIBA, Tokyo (JP)

(72) Inventors: Fumito Miyazaki, Yokohama (JP); Hideaki Murase, Yokohama (JP); Kei Masunishi, Kawasaki (JP); Yasushi Tomizawa, Tokyo (JP); Daiki Ono, Yokohama (JP); Kengo Uchida, Kawasaki (JP); Etsuji Ogawa, Kawasaki (JP); Jumpei Ogawa, Kawasaki (JP); Fumitaka Ishibashi, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 297 days.

(21) Appl. No.: 18/732,146

(22) Filed: Jun. 3, 2024

(65) Prior Publication Data

US 2025/0076054 A1 Mar. 6, 2025

(30) Foreign Application Priority Data

Sep. 1, 2023 (JP) ................................ 2023-142342

(51) Int. Cl.
*G01C 19/5783* (2012.01)

(52) U.S. Cl.
CPC ................................ *G01C 19/5783* (2013.01)

(58) Field of Classification Search
CPC .................................................. G01C 19/5783
See application file for complete search history.

(56) References Cited

U.S. PATENT DOCUMENTS

2020/0284582 A1 9/2020 Kaji et al.
2022/0084767 A1* 3/2022 Yamazaki ............ H01H 1/0036

FOREIGN PATENT DOCUMENTS

JP 6533518 B2 6/2019
JP 2020-144065 A 9/2020
TW I779598 B * 10/2022 ........... B81B 3/0051

* cited by examiner

*Primary Examiner* — Timothy P Graves
(74) *Attorney, Agent, or Firm* — Finnegan, Henderson, Farabow, Garrett & Dunner, LLP

(57) ABSTRACT

According to one embodiment, a sensor includes a first member, a first substrate, and a sensor section. A direction from the first member to the first substrate is along a first direction. A first member thickness of the first member is thicker than a first substrate thickness of the first substrate along the first direction. The sensor section is provided between the first member and the first substrate, and is fixed to the first member. The substrate is fixed to the sensor section. The sensor section includes a housing and a sensor element provided in the housing. The sensor element includes a sensor base, a fixed portion fixed to the sensor base, and a movable portion supported by the fixed portion. A direction from the fixed portion to the sensor base is along the first direction. A first gap is provided between the sensor base and the movable portion.

20 Claims, 7 Drawing Sheets

SENSOR, SENSOR SYSTEM, AND ELECTRONIC DEVICE

CROSS-REFERENCE TO RELATED APPLICATIONS

This application is based upon and claims the benefit of priority from Japanese Patent Application No. 2023-142342, filed on Sep. 1, 2023; the entire contents of which are incorporated herein by reference.

FIELD

Embodiments described herein relate generally to a sensor, a sensor system, and an electronic device.

BACKGROUND

For example, there are sensors having a MEMS (Micro Electro Mechanical Systems) structure. In some cases, electronic devices and the like are controlled based on information obtained by sensors. It is desired to improve the characteristics of sensors.

DETAILED DESCRIPTION

Figure 1:
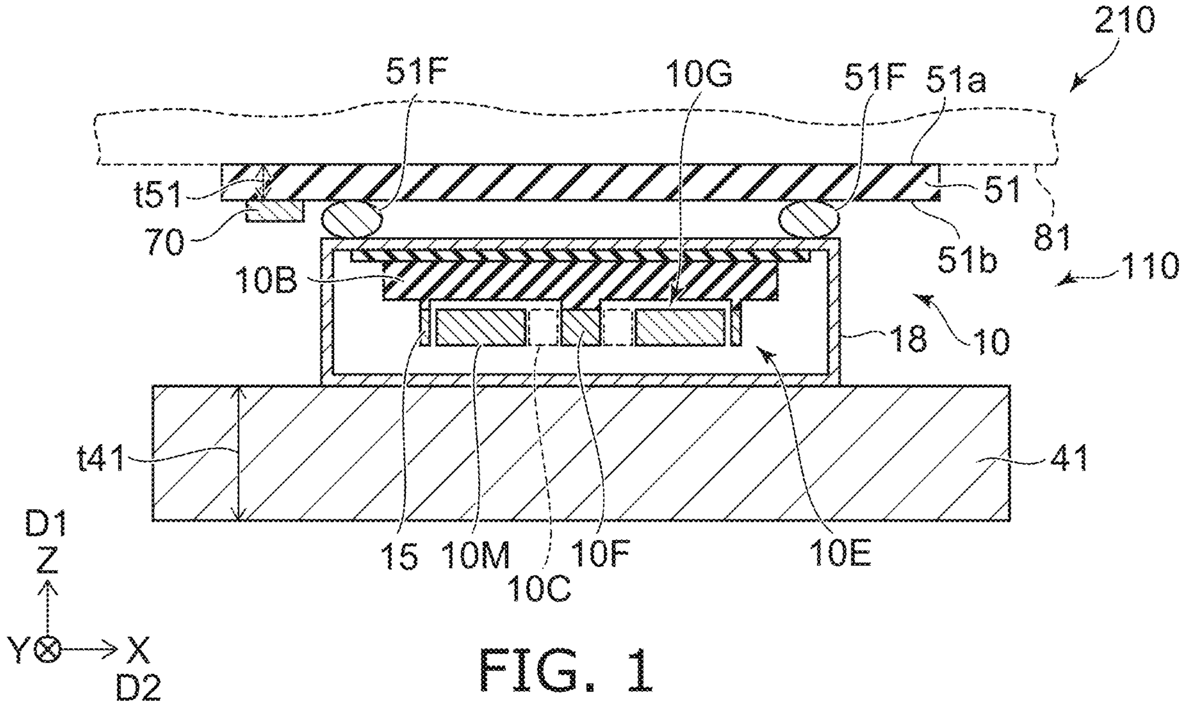
FIG. 1 is a schematic cross-sectional view illustrating a sensor according to a first embodiment.

According to one embodiment, a sensor includes a first member, a first substrate, and a sensor section. A direction from the first member to the first substrate is along a first direction. A first member thickness of the first member along the first direction is thicker than a first substrate thickness of the first substrate along the first direction. The sensor section is provided between the first member and the first substrate. The sensor section is fixed to the first member. The substrate is fixed to the sensor section. The sensor section includes a housing and a sensor element provided in the housing. The sensor element includes a sensor base, a fixed portion fixed to the sensor base, and a movable portion supported by the fixed portion. A direction from the fixed portion to the sensor base is along the first direction. A first gap is provided between the sensor base and the movable portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a sensor according to a first embodiment.

Figure 2:
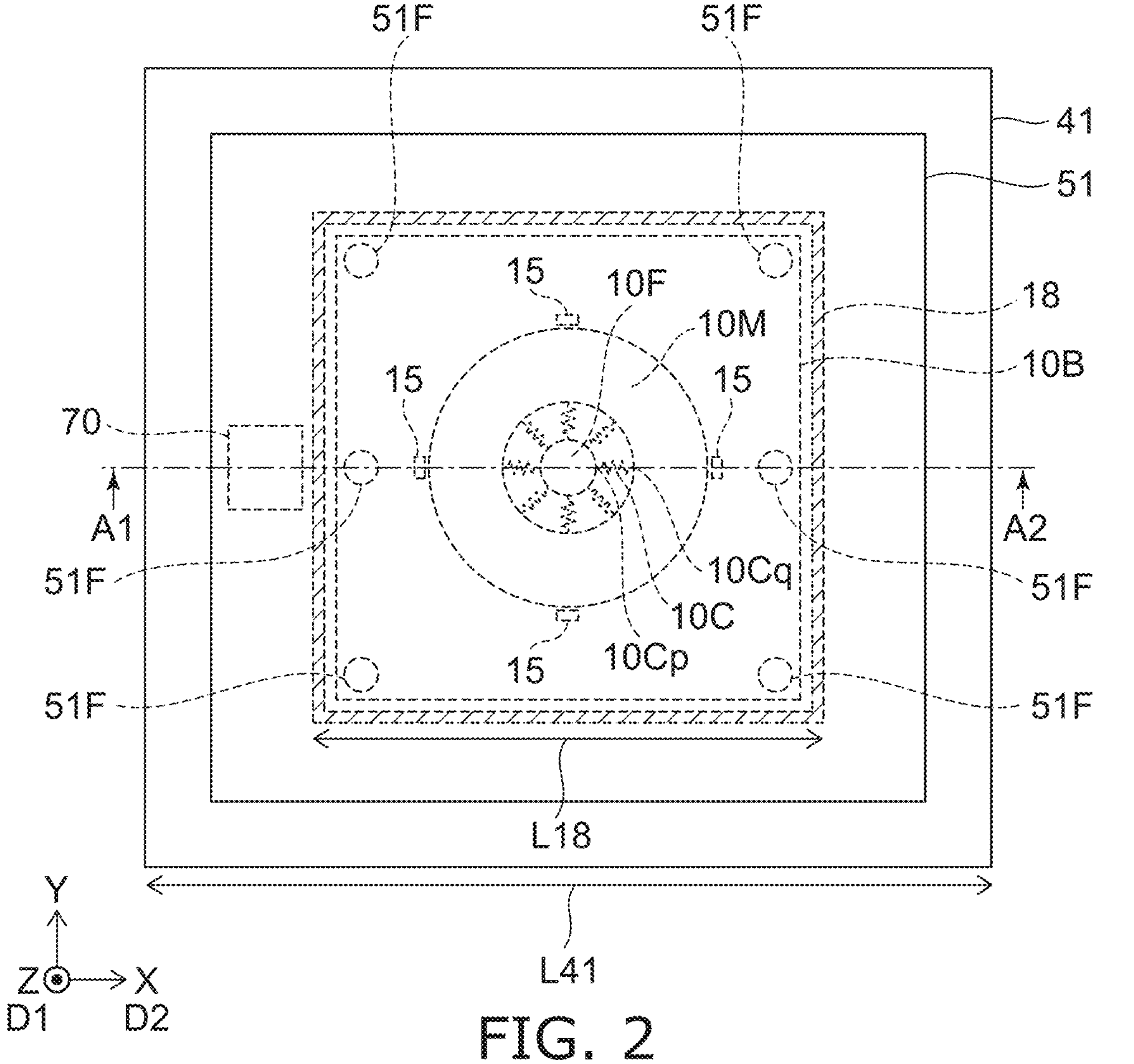
FIG. 2 is a schematic plan view illustrating the sensor according to the first embodiment.

FIG. 2 is a schematic plan view illustrating the sensor according to the first embodiment.

FIG. 1 is a sectional view taken along the line A1-A2 in FIG. 2.

As shown in FIG. 1, a sensor 110 according to the embodiment includes a first member 41, a first substrate 51, and a sensor section 10.

A direction from the first member 41 to the first substrate 51 is along a first direction D1. The first direction D1 is defined as a Z-axis direction. One direction perpendicular to the Z-axis direction is defined as an X-axis direction. A direction perpendicular to the Z-axis direction and the X-axis direction is defined as a Y-axis direction.

The sensor section 10 is provided between the first member 41 and the first substrate 51. The sensor section 10 is fixed to the first member 41. The first substrate 51 is fixed to the sensor section 10. In this example, the sensor 110 further includes a first fixing member 51F. For example, the first fixing member 51F is provided between the sensor section 10 and the first substrate 51. The first fixing member 51F fixes the sensor section 10 to the first substrate 51. The first fixing member 51F may fix the side part of the sensor section 10 to the first substrate 51. A plurality of first fixing members 51F may be provided. The first fixing member 51F includes, for example, metal. The first fixing member 51F may include, for example, solder. Stable and strong fixing can be obtained.

The sensor section 10 includes a housing 18 and a sensor element 10E provided in the housing 18. The pressure inside the housing 18 is less than 1 atmosphere. By the inside of the housing 18 being in a reduced pressure state, for example, influence of temperature changes outside the housing 18 is suppressed.

The sensor element 10E includes a sensor base 10B, a fixed portion 10F, and a movable portion 10M. The sensor base 10B may be, for example, a silicon substrate.

The fixed portion 10F is fixed to the sensor base 10B. The movable portion 10M is supported by the fixed portion 10F. A direction from the fixed portion 10F to the sensor base 10B is along the first direction D1. A first gap 10G is provided between the sensor base 10B and the movable portion 10M.

In this example, the sensor element 10E further includes a connect member 10C. A portion 10Cp (see FIG. 2) of the connect member 10C is supported by the fixed portion 10F. The other portion 10Cq (see FIG. 2) of the connect member 10C supports the movable portion 10M. The connect member 10C has, for example, a meander structure (or a spring structure). By providing the connect member 10C having spring structure, the movable portion 10M moves easily. The fixed portion 10F is, for example, an anchor.

The movable portion 10M is movable within the X-Y plane, for example. As shown in FIGS. 1 and 2, the sensor element 10E may further include an electrode 15. By applying an AC voltage between the electrode 15 and the movable portion 10M, the movable portion 10M can vibrate. For example, when an external force (for example, angular velocity) is applied to the movable portion 10M vibrating, the vibration state of the movable portion 10M changes. The external force can be detected by detecting a change in the vibration state of the movable portion 10M. The change in the vibration state due to external force is, for example, the effect of Coriolis force.

The housing 18 provided with the sensor element 10E is fixed to the first substrate 51. As shown in FIG. 1, the first substrate 51 includes a first face 51*a* and a second face 51*b*. The second face 51*b* is located between the sensor section 10 and the first face 51*a* in the first direction D1. The second face 51*b* faces the sensor section 10. The first face 51*a* faces the detection member 81 to which the first substrate 51 is fixed. The detection member 81 is an object to be inspected by the sensor 110.

As shown in FIG. 1, the sensor 110 may include a controller 70. The controller 70 is, for example, an electric circuit. The controller 70 is provided on the first substrate 51. The controller 70 is provided, for example, on the second face 51*b*. The movable portion 10M vibrates in response to a control signal from the controller 70. The vibration state of the movable portion 10M is detected by the controller 70.

When the sensor section 10 is fixed to the first substrate 51, energy dissipation due to the anchor portion occurs in a system including the movable portion 10M, the fixed portion 10F, the sensor base 10B, the first fixing member 51F, and the first substrate 51. For example, there is a case where the Q-factor changes. In such a configuration, for example, an elastic wave may propagate asymmetrically. As a result, there may be a 10 difference in the excitation intensity of the movable portion 10M of the sensor 110 in the X-Y plane, and the stability of the detection may be deteriorated.

In the embodiment, the first member 41 is fixed to the sensor section 10. The first member 41 functions, for example, as a mass member. By providing the mass member, dissipation of energy can be suppressed. For example, the difference in excitation intensity in the X-Y plane can be reduced. For example, the influence of asymmetric propagation of elastic waves is suppressed. According to the embodiment, a sensor capable of improving stability can be provided.

As shown in FIG. 1, a thickness of the first member 41 along the first direction D1 is defined as a first member thickness t41. A thickness of the first substrate 51 along the first direction D1 is defined as a first substrate thickness t51. In the embodiment, the first member thickness t41 is thicker than the first substrate thickness t51. This makes it easier for the first member 41 to function as a mass member. Stable vibration of the movable portion 10M can be maintained.

For example, a density of the first member 41 is higher than a density of the first substrate 51. For example, a mass of the first member 41 is greater than a mass of the first substrate 51. The mass of the first member 41 is greater than a mass of the movable portion 10M. By the first member 41 being sufficiently heavy, stable vibration of the movable portion 10M can be maintained.

For example, the first member 41 includes metal. For example, the first member 41 may include at least one selected from the group consisting of aluminum, iron, and copper. By high density, it becomes easy for the first member 41 to function as a mass member.

As shown in FIG. 2, the first member 41 has a first member length L41 in a second direction D2 perpendicular to the first direction D1. The second direction D2 is, for example, the X-axis direction. The housing 18 has a housing length L18 in the second direction D2. The first member length L41 is preferably not less than 0.9 times and not more than 5 times the housing length L18. When the first member length L41 is excessively short, the function of the first member 41 as a mass member tends to deteriorate. When the first member length L41 is excessively long, the first member 41 is likely to be deflected, and the influence of other vibration components becomes large. The first member length L41 may be not less than 1 time and not more than 50 times the housing length L18.

The movable portion 10M can resonate at a first frequency f1 (unit: Hz). The first sound velocity v1 (unit: m/s) of the transverse wave in the first member 41 is the product of the first frequency f1 and the first wavelength λ1 (unit: m) of the transverse wave in the first member 41. In the embodiment, the first member thickness t41 is preferably ¼ times or more the first wavelength λ1. Thereby, loss of transverse wave energy can be effectively suppressed.

As previously described, the first member 41 has the first member length L41 (m) in the second direction D2 perpendicular to the first direction D1 (see FIG. 2). The second sound velocity v2 (m/s) of the longitudinal wave in the first member 41 is the product of the first frequency f1 of resonance of the movable portion 10M and the second wavelength λ2 (m) of the longitudinal wave in the first member 41. In the embodiment, the first member length L41 is preferably ¼ times or more of the second wavelength λ2. Thereby, the loss of energy of the longitudinal wave can be effectively suppressed.

Examples of characteristics of the sensor 110 will be described below.

Figure 3:
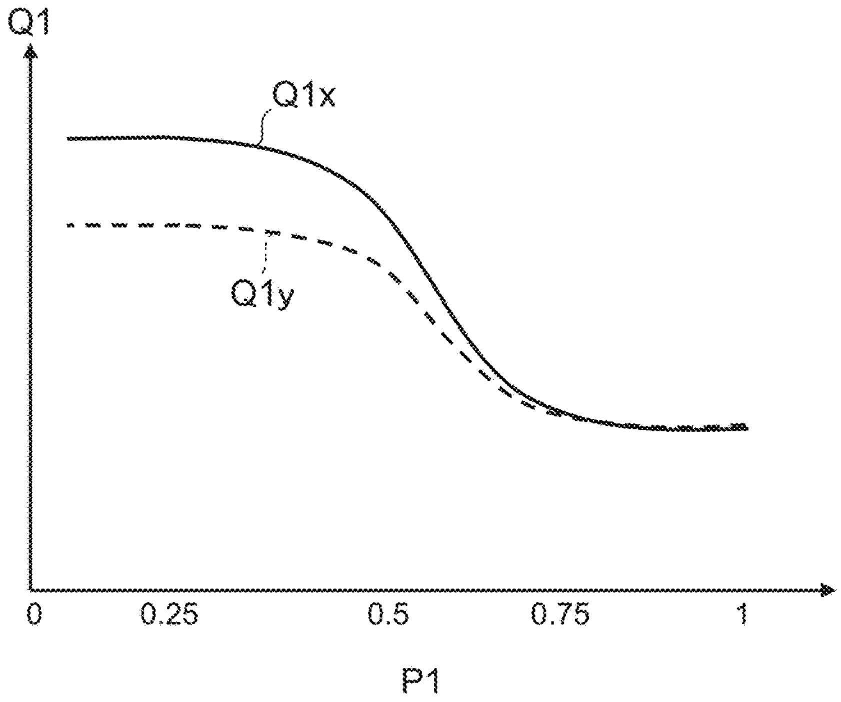
FIG. 3 is a graph illustrating the characteristics of the sensor.

FIG. 3 is a graph illustrating the characteristics of the sensor.

FIG. 3 illustrates the characteristics when a ratio of the first member thickness t41 to the first wavelength λ1 is changed. The horizontal axis in FIG. 3 is a first parameter P1. The first parameter P1 is the ratio (t41/λ1) of the first member thickness t41 to the first wavelength λ1. The vertical axis in FIG. 3 is, for example, the Q-factor Q1 of the movable portion 10M.

In the sensor section 10, the movable portion 10M is excited in an arbitrary direction. The excitation includes the excitation along the X-axis direction and the excitation along the Y-axis direction. FIG. 3 illustrates the Q-factor Q1*x* of excitation along the X-axis direction and the Q-factor Q1*y* of excitation along the Y-axis direction. The difference between the Q-factor Q1*x* and the Q-factor Q1*y* is caused, for example, by the influence of asymmetric propagation of elastic waves. As shown in FIG. 3, when the first parameter P1 is 0.25 or more, the difference between the Q-factor Q1*x* and the Q-factor Q1*y* becomes small. In the embodiment, the first parameter P1 may be 1 or more. The difference of the Q-factor with respect to the excitation direction becomes smaller, and symmetrical vibration in the X-Y plane is easily obtained. In the embodiment, the first member thickness t41 is preferably 1 times or more of the first wavelength λ1. In the embodiment, for example, the first member thickness t41 is preferably 5 times or less of the first wavelength λ1. If the first member thickness t41 is excessively thick, for example, at least one of the sensor section 10 and the first fixing member 51F tends to be strained.

Figure 4:
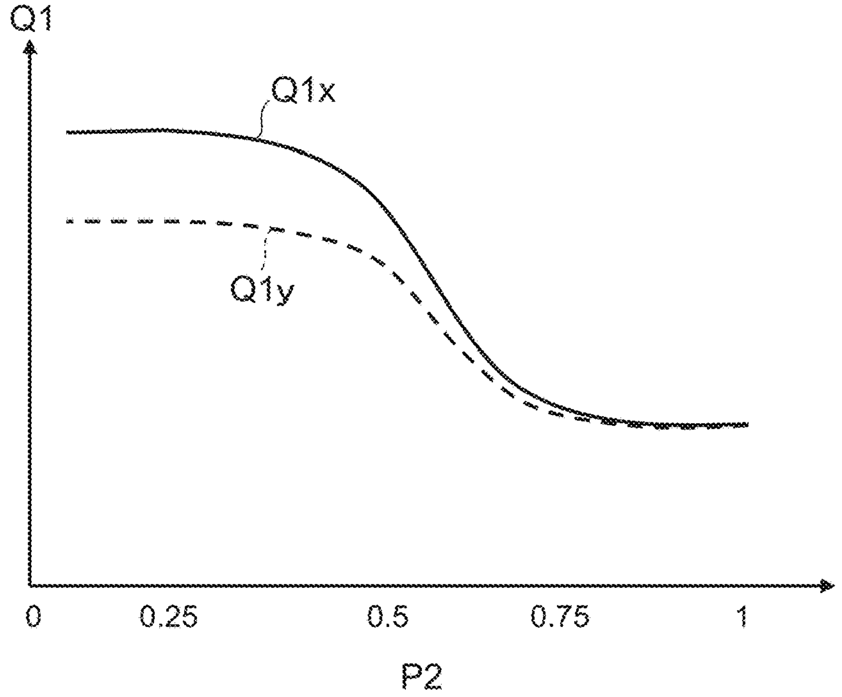
FIG. 4 is a graph illustrating the characteristics of the sensor.

FIG. 4 is a graph illustrating the characteristics of the sensor.

FIG. 4 illustrates the characteristics when the ratio of the first member length L41 to the second wavelength λ2 is changed. The horizontal axis in FIG. 4 is a second parameter P2. The second parameter P2 is the ratio (L41/λ2) of the first member length L41 to the second wavelength λ2. The vertical axis in FIG. 4 is, for example, the Q-factor Q1 of the movable portion 10M.

FIG. 4 illustrates the Q-factor $Q1x$ of excitation along the X-axis direction and the Q-factor $Q1y$ of excitation along the Y-axis direction. As shown in FIG. 4, when the second parameter P2 is 0.25 or more, the difference between the Q-factor $Q1x$ and the Q-factor $Q1y$ becomes small. In the embodiment, the second parameter P2 may be 1 or more. The difference of the Q-factor with respect to the excitation direction becomes smaller, and symmetrical vibration in the X-Y plane is easily obtained. In the embodiment, the first member length L41 is preferably 1 times or more of the second wavelength λ2. In the embodiment, for example, the first member length L41 is preferably 5 times or less of the second wavelength λ2. If the first member length L41 is excessively thick, for example, at least one of the sensor section 10 and the first fixing member 51F tends to be strained.

Figure 5:
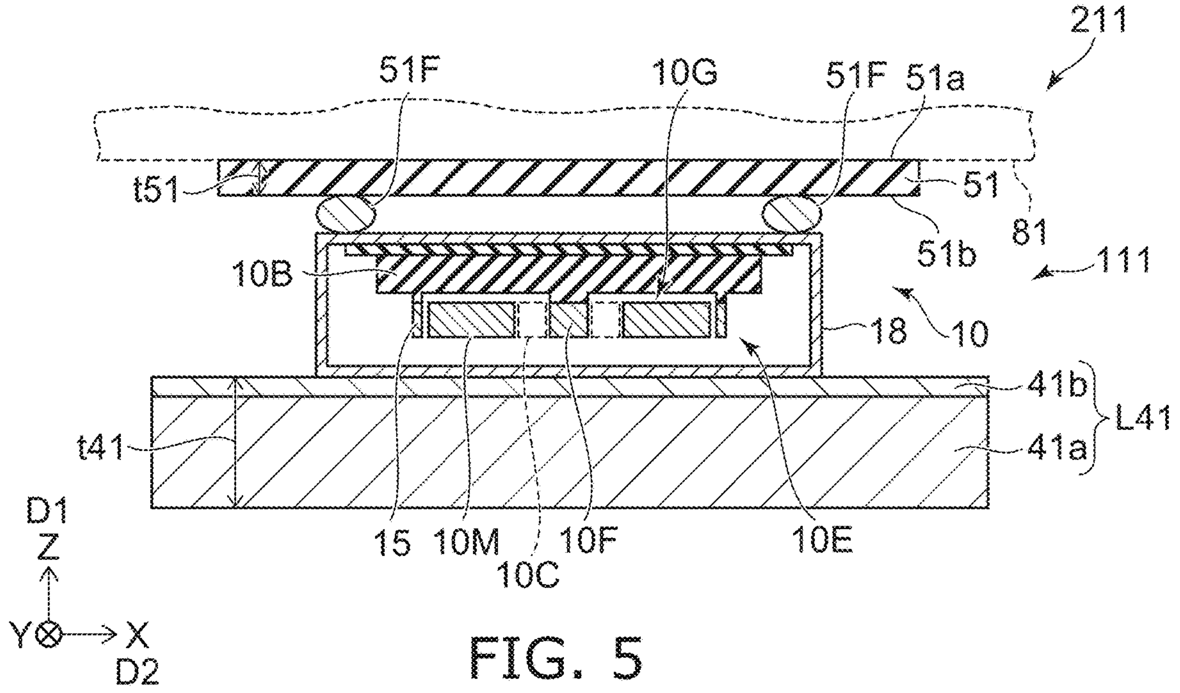
FIG. 5 is a schematic cross-sectional view illustrating a sensor according to the first embodiment.

FIG. 5 is a schematic cross-sectional view illustrating a sensor according to the first embodiment.

As shown in FIG. 5, in a sensor 111 according to the embodiment, the first member 41 has a stacked structure. The configuration of the sensor 111 except for this may be the same as the configuration of the sensor 110.

In the sensor 111, the first member 41 includes a first partial region 41*a* and a second partial region 41*b*. The second partial region 41*b* is provided between the first partial region 41*a* and the housing 18. The second material of the second partial region 41*b* is different from the first material of the first partial region 41*a*. The first partial region 41*a* includes metal. For example, the second partial region 41*b* may include a metal different from the metal of the first partial region 41*a*.

For example, the first partial region 41*a* may include at least one selected from the group consisting of aluminum, iron, and copper. For example, the second partial region 41*b* includes solder or the like. For example, the melting point of the second material is lower than the melting point of the first material. The second partial region 41*b* may be, for example, an adhesive region.

By the first member 41 including the plurality of partial regions made of different materials, design and manufacturing becomes easy.

In one example, a thickness of the first partial region 41*a* along the first direction D1 may be greater than a thickness of the second partial region 41*b* along the first direction D1.

Figure 6:
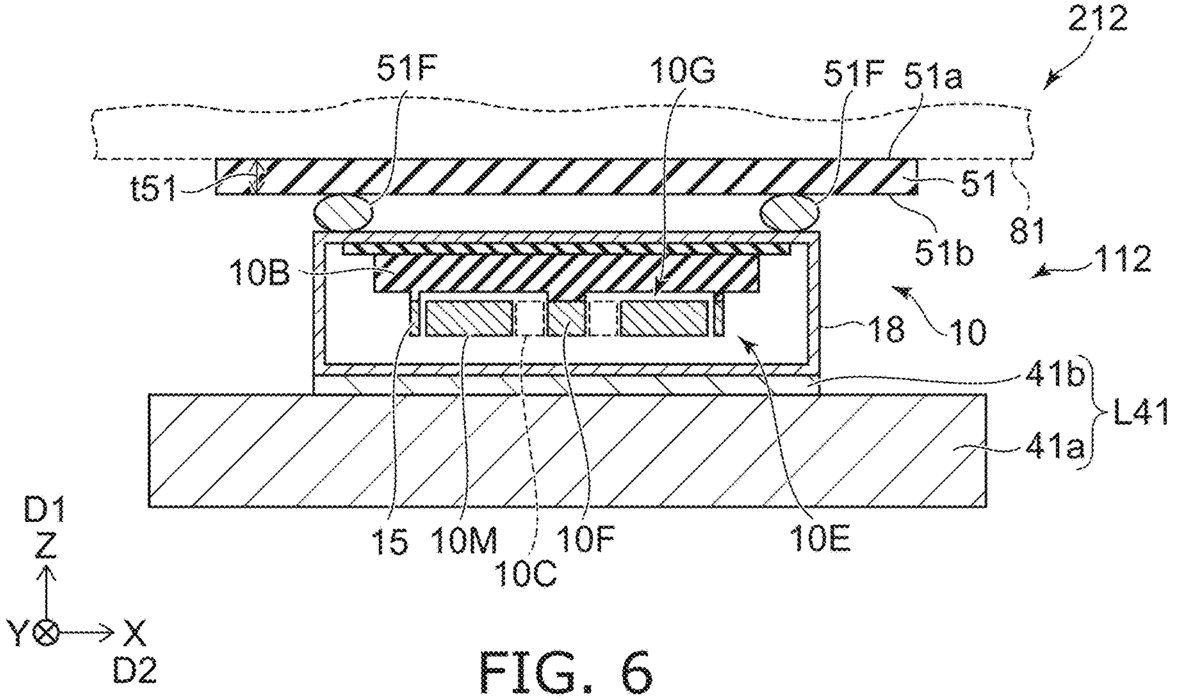
FIG. 6 is a schematic cross-sectional view illustrating a sensor according to the first embodiment.

FIG. 6 is a schematic cross-sectional view illustrating a sensor according to the first embodiment.

As shown in FIG. 6, also in a sensor 112 according to the embodiment, the first member 41 includes the first partial region 41*a* and the second partial region 41*b*. In the sensor 112, the configuration of the second partial region 41*b* is different from the configuration of the second partial region 41*b* in the sensor 111. The configuration of the sensor 112 except for this may be the same as the configuration of the sensor 111.

As shown in FIG. 6, in the sensor 112, the second partial region 41*b* is provided between a part of the first partial region 41*a* and the housing 18. For example, the second partial region 41*b* may be provided in a region that overlaps the housing 18 and the first direction D1.

Second Embodiment

The second embodiment relates to a sensor system. As shown in FIG. 1, a sensor system 210 according to the second embodiment includes the sensor 110 and the detection member 81. As shown in FIG. 5, a sensor system 211 according to the second embodiment includes the sensor 111 and the detection member 81. As shown in FIG. 6, a sensor system 212 according to the second embodiment includes the sensor 112 and the detection member 81. In the second embodiment, highly accurate detection results are obtained.

Third Embodiment

A Third embodiment relates to an electronic device.

Figure 7:
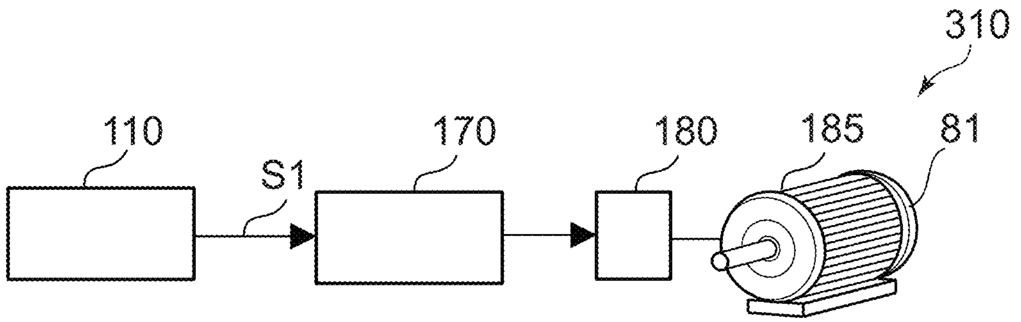
FIG. 7 is a schematic diagram illustrating an electronic device according to a third embodiment.

FIG. 7 is a schematic diagram illustrating an electronic device according to a third embodiment.

As shown in FIG. 7, an electronic device 310 according to the embodiment includes the sensors according to the first to third embodiments and the circuit processor 170. In the example of FIG. 7, the sensor 110 is drawn as the sensor. The circuit processor 170 is configured to control a circuit 180 based on the signal S1 obtained from the sensor. The circuit 180 is, for example, a control circuit for a drive device 185. According to the embodiment, for example, the circuit 180 for controlling the drive device 185 can be controlled with high accuracy.

FIGS. 8A to 8H are schematic views illustrating applications of the electronic device according to the embodiment.

Figure 8A:
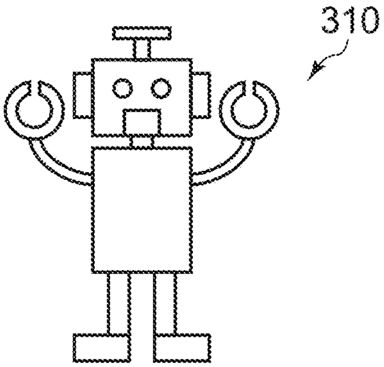
FIGS. 8A to 8H are schematic views illustrating applications of the electronic device according to the embodiment.
Figure 8B:
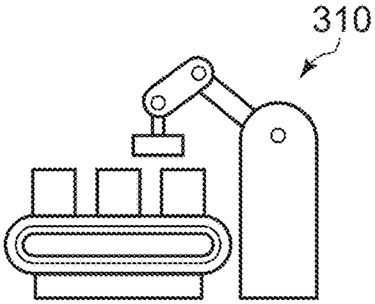
Figure 8C:
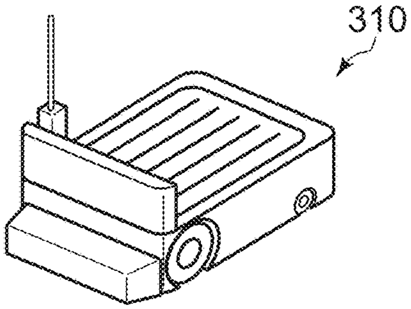
Figure 8D:
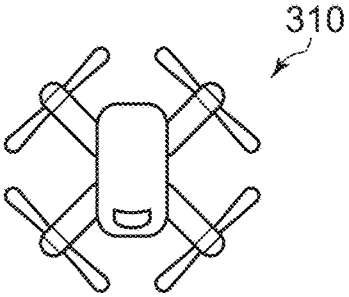
Figure 8E:
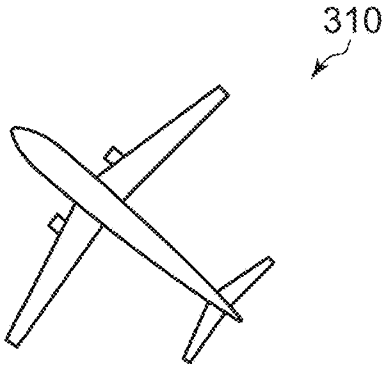
Figure 8F:
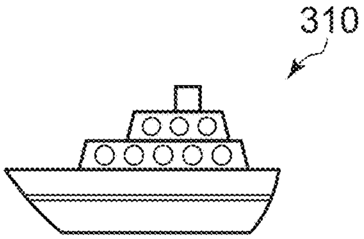
Figure 8G:
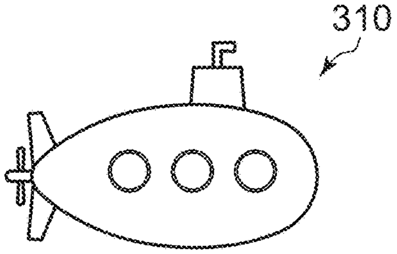
Figure 8H:
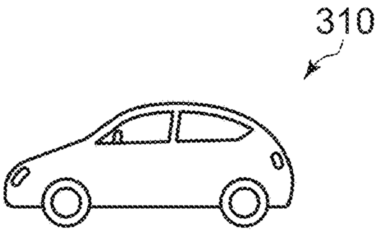

As shown in FIG. 8A, the electronic device 310 may be at least a portion of a robot. As shown in FIG. 8B, the electronic device 310 may be at least a portion of a machining robot provided in a manufacturing plant, etc. As shown in FIG. 8C, the electronic device 310 may be at least a portion of an automatic guided vehicle inside a plant, etc. As shown in FIG. 8D, the electronic device 310 may be at least a portion of a drone (an unmanned aircraft). As shown in FIG. 8E, the electronic device 310 may be at least a portion of an airplane. As shown in FIG. 8F, the electronic device 310 may be at least a portion of a ship. As shown in FIG. 8G, the electronic device 310 may be at least a portion of a submarine. As shown in FIG. 8H, the electronic device 310 may be at least a portion of an automobile. The electronic device 310 may include, for example, at least one of a robot or a moving body.

Figure 9A:
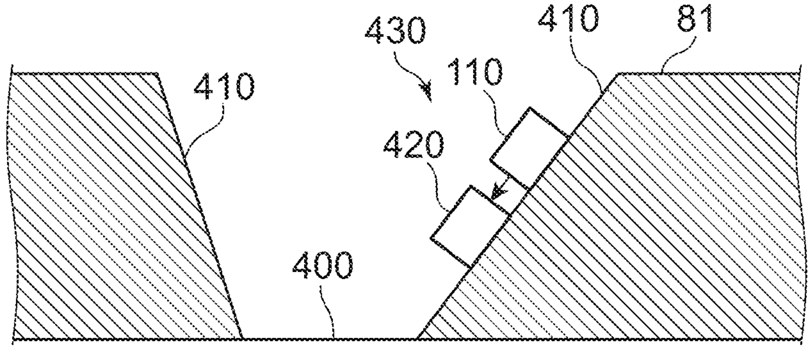
FIGS. 9A and 9B are schematic views illustrating applications of the sensor according to the embodiment.
Figure 9B:
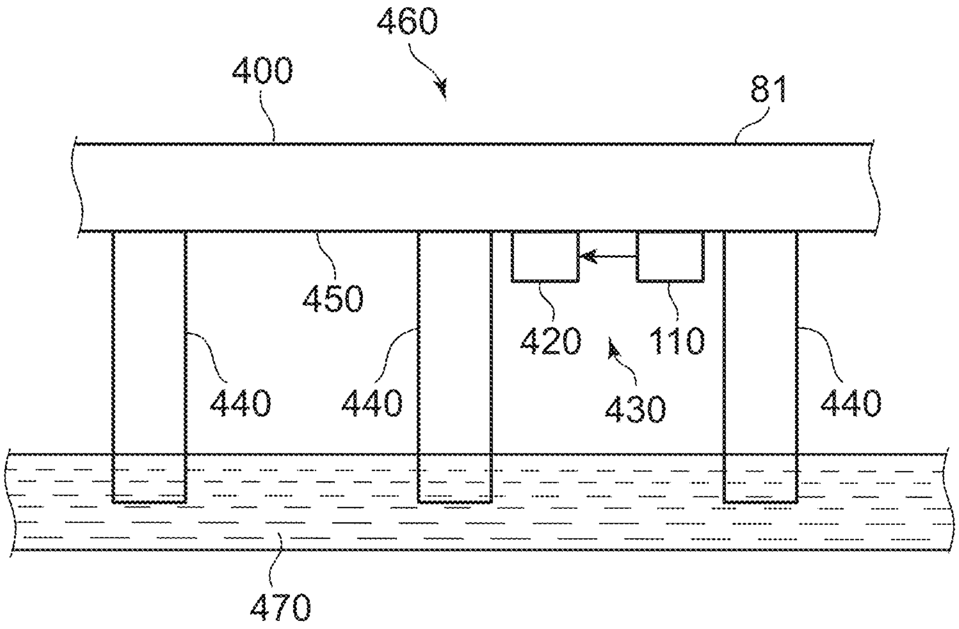

FIGS. 9A and 9B are schematic views illustrating applications of the sensor according to the embodiment.

As shown in FIG. 9A, a sensor 430 according to the fifth embodiment includes the sensor according to one of the first to third embodiments, and a transmission/reception part 420. In the example of FIG. 9A, the sensor 110 is illustrated as the sensor. The transmission/reception part 420 is configured to transmit the signal obtained from the sensor 110 by, for example, at least one of wireless and wired methods. The sensor 430 is provided on, for example, a slope surface 410 such as a road 400. The sensor 430 can monitor the state of, for example, a facility (e.g., infrastructure). The sensor 430 may be, for example, a state monitoring device.

For example, the sensor 430 detects a change in the state of a slope surface 410 of a road 400 with high accuracy. The change in the state of the slope surface 410 includes, for example, at least one of a change in the inclination angle and a change in the vibration state. The signal (inspection result) obtained from the sensor 110 is transmitted by the transmission/reception part 420. The status of a facility (e.g., infrastructure) can be monitored, for example, continuously.

As shown in FIG. 9B, the sensor 430 is provided, for example, in a portion of a bridge 460. The bridge 460 is provided above the river 470. For example, the bridge 460 includes at least one of a main girder 450 and a pier 440. The sensor 430 is provided on at least one of the main girder 450 and the pier 440. For example, at least one of the angles of the main girder 450 and the pier 440 may change due to deterioration or the like. For example, the vibration state may change in at least one of the main girder 450 and the pier 440. The sensor 430 detects these changes with high accuracy. The detection result can be transmitted to an arbitrary place by the transmission/reception part 420. Abnormalities can be detected effectively.

The embodiments may include the following Technical proposals:

Technical Proposal 1

A sensor, comprising:
a first member;
a first substrate, a direction from the first member to the first substrate being along a first direction, a first member thickness of the first member along the first direction being thicker than a first substrate thickness of the first substrate along the first direction; and
a sensor section provided between the first member and the first substrate, the sensor section being fixed to the first member, the first substrate being fixed to the sensor section, the sensor section including a housing and a sensor element provided in the housing, the sensor element including a sensor base, a fixed portion fixed to the sensor base, and a movable portion supported by the fixed portion, a direction from the fixed portion to the sensor base being along the first direction, a first gap being provided between the sensor base and the movable portion.

Technical Proposal 2

The sensor according to Technical proposal 1, wherein
the first substrate includes a first face and a second face,
the second face is located between the sensor section and the first face in the first direction,
the second face faces the sensor section, and
the first face faces a detection member to which the first substrate is fixed.

Technical Proposal 3

The sensor according to Technical proposal 1 or 2, wherein
a density of the first member is higher than a density of the first substrate.

Technical Proposal 4

The sensor according to any one of Technical proposals 1-3, wherein
a mass of the first member is greater than a mass of the movable portion.

Technical Proposal 5

The sensor according to any one of Technical proposals 1-4, wherein
the sensor element further includes a connect member,
a part of the connect member is supported by the fixed portion, and
another part of the connect member supports the movable portion.

Technical Proposal 6

The sensor according to any one of Technical proposals 1-5, wherein
a pressure inside the housing is less than 1 atmosphere.

Technical Proposal 7

The sensor according to any one of Technical proposals 1-6, further comprising:
a first fixing member,
the first fixing member being provided between the sensor section and the first substrate, and
the first fixing member fixing the sensor section to the first substrate.

Technical Proposal 8

The sensor according to Technical proposal 7, wherein
the first fixing member includes metal.

Technical Proposal 9

The sensor according to any one of Technical proposals 1-8, wherein
the movable portion is configured to resonate at a first frequency (unit: Hz),
a first sound velocity (unit: m/s) of a transverse wave in the first member is a product of the first frequency and a first wavelength (unit: m) of the transverse wave in the first member, and
the first member thickness is ¼ times or more the first wavelength.

Technical Proposal 10

The sensor according to Technical proposal 9, wherein
the first member thickness is one or more times the first wavelength.

Technical Proposal 11

The sensor according to Technical proposal 9 or 10, wherein
the first member thickness is 5 times or less of the first wavelength.

Technical Proposal 12

The sensor according to any one of Technical proposals 1-9, wherein
the first member has a first member length in a second direction perpendicular to the first direction,
the housing has a housing length in the second direction, and
the first member length is not less than 0.9 times and not more than 5 times the housing length.

Technical Proposal 13

The sensor according to any one of Technical proposals 1-8, wherein
the movable portion is configured to resonate at a first frequency (unit: Hz),
the first member has a first member length (unit: m) in a second direction perpendicular to the first direction,
a second sound velocity (unit: m/s) of a longitudinal wave in the first member is a product of the first frequency and a second wavelength (unit: m) of the longitudinal wave in the first member, and the first member length is ¼ times or more the second wavelength.

Technical Proposal 14

The sensor according to Technical proposal 13, wherein the first member length is one or more times the second wavelength.

Technical Proposal 15

The sensor according to Technical proposal 13 or 14, wherein the first member length is 5 times or less of the second wavelength.

Technical Proposal 16

The sensor according to any one of Technical proposals 1-15, wherein the first member includes metal.

Technical Proposal 17

The sensor according to any one of Technical proposals 1-15, wherein the first member includes a first partial region and a second partial region, the second partial region is provided between the first partial region and the housing, and a second material of the second partial region is different from a first material of the first partial region.

Technical Proposal 18

The sensor according to Technical proposal 17, wherein a first partial region thickness of the first partial region along the first direction is thicker than a second partial region thickness of the second partial region along the first direction.

Technical Proposal 19

A sensor system, comprising:

the sensor according to Technical proposal 2; and the detection member.

Technical Proposal 20

An electronic device, comprising:

the sensor according to any one of Technical proposals 1-18; and a circuit controller configured to control a circuit based on a signal obtained from the sensor.

According to the embodiment, a sensor, a sensor system, and an electronic device whose characteristics can be improved can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the sensor such as members, substrates, sensor sections, housings, sensor elements, bases, fixed portions, movable portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors, all sensor systems, and all electronic devices practicable by an appropriate design modification by one skilled in the art based on the sensors, the sensor systems, and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

a first member;

a first substrate, a direction from the first member to the first substrate being along a first direction, a first member thickness of the first member along the first direction being thicker than a first substrate thickness of the first substrate along the first direction; and a sensor section provided between the first member and the first substrate, the sensor section being fixed to the first member, the first substrate being fixed to the sensor section, the sensor section including a housing and a sensor element provided in the housing, the sensor element including a sensor base, a fixed portion fixed to the sensor base, and a movable portion supported by the fixed portion, a direction from the fixed portion to the sensor base being along the first direction, a first gap being provided between the sensor base and the movable portion.

2. The sensor according to claim 1, wherein the first substrate includes a first face and a second face, the second face is located between the sensor section and the first face in the first direction, the second face faces the sensor section, and the first face faces a detection member to which the first substrate is fixed.

3. The sensor according to claim 1, wherein a density of the first member is higher than a density of the first substrate.

4. The sensor according to claim 1, wherein a mass of the first member is greater than a mass of the movable portion.

5. The sensor according to claim 1, wherein the sensor element further includes a connect member, a part of the connect member is supported by the fixed portion, and another part of the connect member supports the movable portion.

6. The sensor according to claim 1, wherein a pressure inside the housing is less than 1 atmosphere.

7. The sensor according to claim 1, further comprising:

a first fixing member, the first fixing member being provided between the sensor section and the first substrate, and the first fixing member fixing the sensor section to the first substrate.

8. The sensor according to claim 7, wherein the first fixing member includes metal.

9. The sensor according to claim 1, wherein the movable portion is configured to resonate at a first frequency (unit: Hz), a first sound velocity (unit: m/s) of a transverse wave in the first member is a product of the first frequency and a first wavelength (unit: m) of the transverse wave in the first member, and the first member thickness is ¼ times or more the first wavelength.

10. The sensor according to claim 9, wherein the first member thickness is one or more times the first wavelength.

11. The sensor according to claim 9, wherein the first member thickness is 5 times or less of the first wavelength.

12. The sensor according to claim 1, wherein the first member has a first member length in a second direction perpendicular to the first direction, the housing has a housing length in the second direction, and the first member length is not less than 0.9 times and not more than 5 times the housing length.

13. The sensor according to claim 1, wherein the movable portion is configured to resonate at a first frequency (unit: Hz), the first member has a first member length (unit: m) in a second direction perpendicular to the first direction, a second sound velocity (unit: m/s) of a longitudinal wave in the first member is a product of the first frequency and a second wavelength (unit: m) of the longitudinal wave in the first member, and the first member length is ¼ times or more the second wavelength.

14. The sensor according to claim 13, wherein the first member length is one or more times the second wavelength.

15. The sensor according to claim 13, wherein the first member length is 5 times or less of the second wavelength.

16. The sensor according to claim 1, wherein the first member includes metal.

17. The sensor according to claim 1, wherein the first member includes a first partial region and a second partial region, the second partial region is provided between the first partial region and the housing, and a second material of the second partial region is different from a first material of the first partial region.

18. The sensor according to claim 17, wherein a first partial region thickness of the first partial region along the first direction is thicker than a second partial region thickness of the second partial region along the first direction.

19. A sensor system, comprising:

the sensor according to claim 2; and the detection member.

20. An electronic device, comprising:

the sensor according to claim 1; and a circuit controller configured to control a circuit based on a signal obtained from the sensor.

* * * * *